(12) United States Patent
Blatherwick

(10) Patent No.: US 6,629,770 B2
(45) Date of Patent: Oct. 7, 2003

(54) ILLUMINATED SPARKLING PUMPKIN

(75) Inventor: Brian Blatherwick, Oakville (CA)

(73) Assignee: Seasons HK Limited, Ontario (CA)

( * ) Notice: Subject to any disclaimer, the term of this patent is extended or adjusted under 35 U.S.C. 154(b) by 0 days.

(21) Appl. No.: 10/081,451

(22) Filed: Feb. 20, 2002

(65) Prior Publication Data
US 2003/0156415 A1 Aug. 21, 2003

(51) Int. Cl.[7] .................................. F21V 3/00
(52) U.S. Cl. ................. 362/363; 362/186; 362/351; 362/361; 362/154; 362/808; 362/806
(58) Field of Search ................. 362/186, 363, 362/351, 361, 154, 808, 806

(56) References Cited

U.S. PATENT DOCUMENTS

| | | | | |
|---|---|---|---|---|
| 4,963,117 A | * | 10/1990 | Gualdoni | 446/219 |
| 5,091,833 A | * | 2/1992 | Paniaguas et al. | 362/191 |
| 5,526,243 A | * | 6/1996 | Masters | 362/122 |
| 5,830,034 A | * | 11/1998 | Ciechanowski et al. | 446/219 |
| 5,878,945 A | * | 3/1999 | Weder | 229/117.01 |
| 5,918,964 A | * | 7/1999 | Bou | 362/186 |
| 5,954,603 A | * | 9/1999 | Chursinoff | 473/594 |
| 6,027,229 A | * | 2/2000 | Wang | 362/253 |
| 6,030,098 A | * | 2/2000 | Wang | 362/253 |
| 6,048,078 A | * | 4/2000 | Wang | 362/253 |
| 6,059,676 A | * | 5/2000 | Seymour et al. | 473/570 |
| 6,309,092 B1 | * | 10/2001 | Bardeen et al. | 362/392 |

* cited by examiner

Primary Examiner—Sandra O'Shea
Assistant Examiner—Jacob Y. Choi
(74) Attorney, Agent, or Firm—Squire, Sanders & Dempsey L.L.P.

(57) ABSTRACT

Disclosed is a decorative novelty illuminated sparkling pumpkin device having a main body shell made of pelletized ethylene vinyl acetate copolymers bonded in a molding process, and a light source providing illumination within the hollow interior space of the main body shell whereby the pelletized ethylene vinyl acetate copolymers impart an enhanced sparkling/glowing effect upon illumination from the light source. A method of manufacturing such an illuminated sparkling pumpkin device is also disclosed.

18 Claims, 4 Drawing Sheets

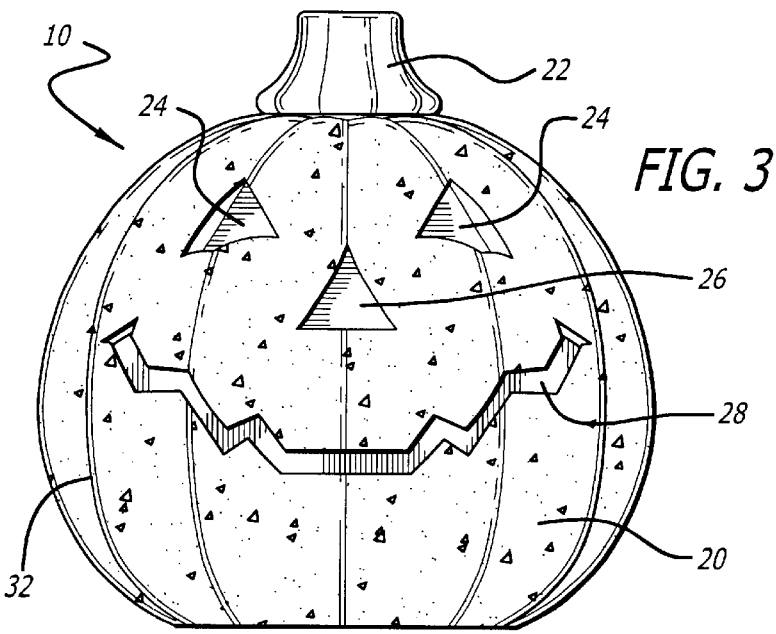
FIG. 3
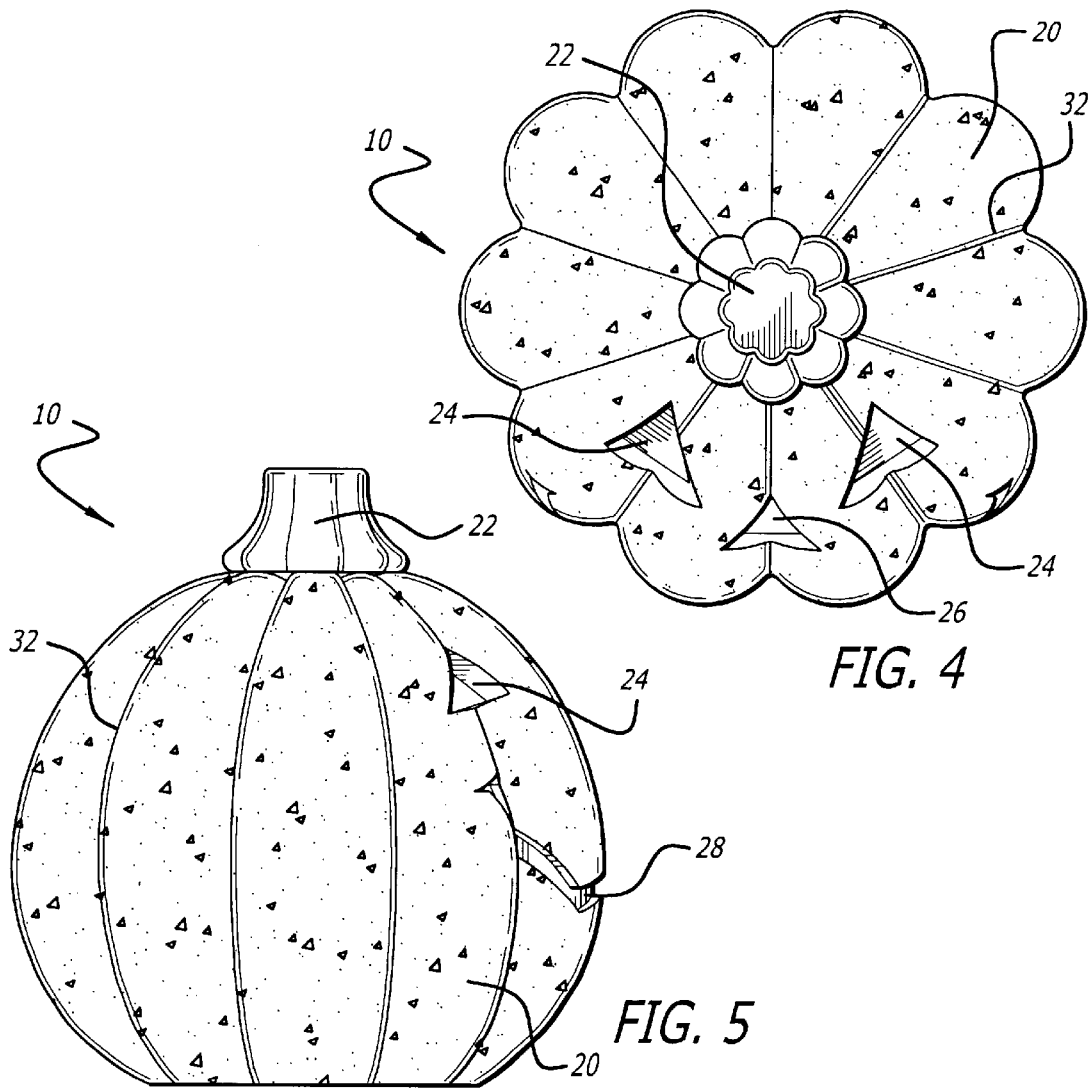
FIG. 4
FIG. 5

ILLUMINATED SPARKLING PUMPKIN

BACKGROUND OF THE INVENTION

1. Field of the Invention

This invention generally relates to an illuminated sparkling pumpkin or Jack-o-lantern decoration and a method of making such a decoration.

2. Background

Conventional novelty illumination articles such as Halloween Jack-o-lanterns may be made, for example, by removing the soft pulp of a pumpkin, carving side openings representing eyes, nose and mouth, and placing inside the hollow pumpkin a burning candle to illuminate these openings and the pumpkin head. These real pumpkin decorations are, however, perishable and cannot be displayed for more than a few days. They are also messy to carve, and can be easily broken if dropped on the floor.

To overcome some of the problems associated with real pumpkin decorations, artificial Jack-o-lanterns have been developed which are made of styrofoam, urethane, paper or plastic products. Some of these artificial pumpkins known in the art have electric lights to replace the candles of real pumpkin Jack-o-lanterns. Similarly, doll or cartoon heads or skulls have been made with individual permanently affixed facial elements such as eyes, nose or teeth with permanent means for electrically lighting them.

Thus, with conventional pumpkin decorations known in the art, in addition to placing a light source inside the hollow pumpkin, holes may be provided on the face of the pumpkin to give additional illumination effect. Alternatively, facial elements such as eyes, nose, or mouth may be affixed on the pumpkin face, and illumination is achieved only through these facial elements which are connected to an electrical lighting source or other glowing mechanism. The goal of such products is to provide decorative items, particularly for display at night, and thus the light effect of the item is a significant product feature.

BRIEF SUMMARY OF THE INVENTION

This invention relates to an illuminated sparkling pumpkin decoration that can be formed as a novelty item such as a Halloween Jack-o-lantern pumpkin. The illuminated sparkling pumpkin device of the present invention has a durable and reliable construction, and can be reused in subsequent years.

The illuminated sparkling pumpkin of the present invention is made utilizing an easy and efficient molding manufacturing process. In one embodiment, pelletized ethylene vinyl acetate copolymers (EVAs) are used as a raw material for forming the shell of the pumpkin by molding in a rotational molding process. The illuminated sparkling pumpkin has a primary light source comprising a light bulb and a battery chamber installed in the hollow interior section of the illuminated sparkling pumpkin. The exterior surface of the illuminated sparkling pumpkin comprised of the pelletized EVAs provides an enhanced illumination effect, and imparts a sparkling or glowing characteristic when illuminated from the interior. The method of construction of the present invention using EVAs provides the enhanced sparkling or glowing effect when illuminated.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 3 is a front view of the illuminated sparkling pumpkin according to one embodiment of the present invention.

FIG. 4 is a top view of the illuminated sparkling pumpkin according to one embodiment of the present invention.

FIG. 5 is a side view of the illuminated sparkling pumpkin according to one embodiment of the present invention.

DETAILED DESCRIPTION OF PREFERRED EMBODIMENTS

Figure 1:
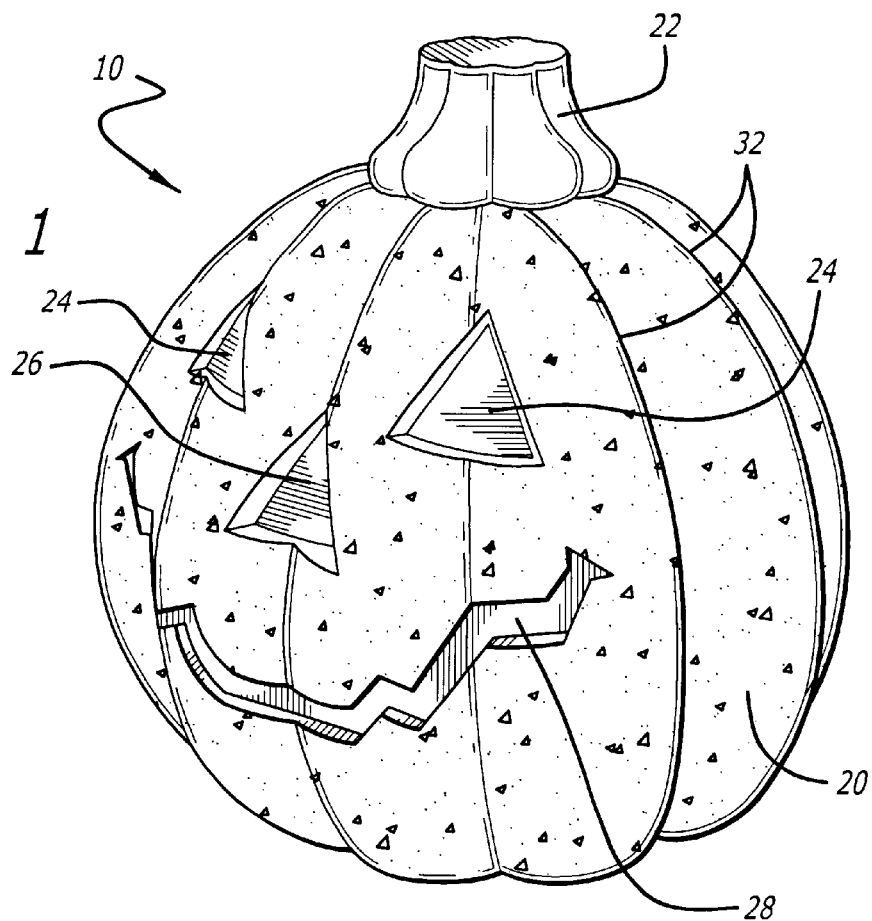
FIG. 1 is a perspective view of an illuminated sparkling pumpkin according to one embodiment of the present invention.
Figure 2:
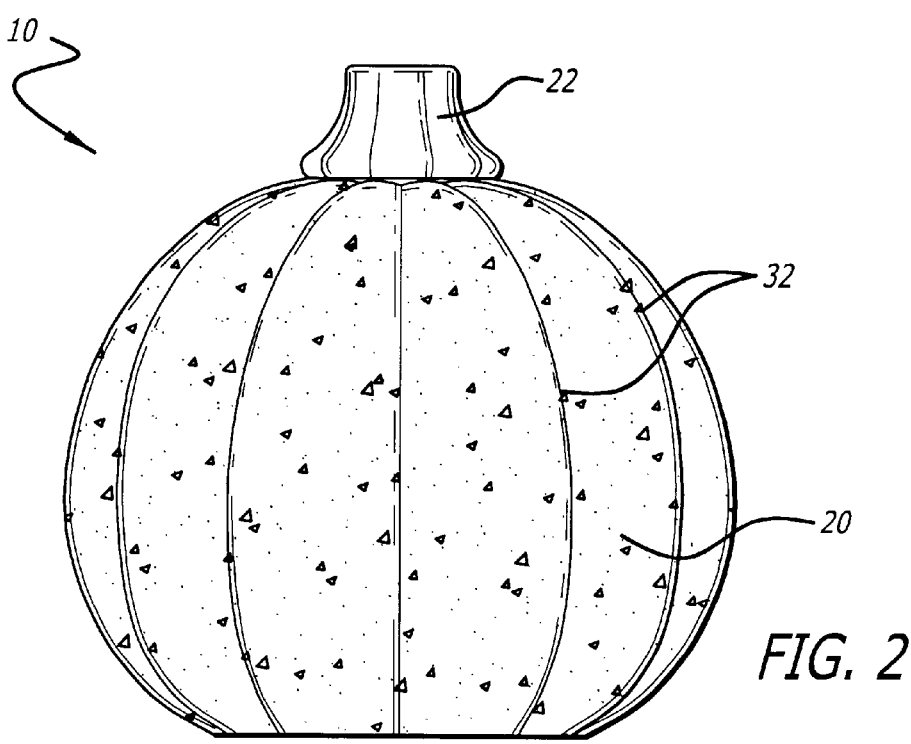
FIG. 2 is a rear view of the illuminated sparkling pumpkin according to one embodiment of the present invention.

This description is not to be taken in a limiting sense, but is made for the purpose of illustrating the general principles of the invention. The section titles and overall organization of the present detailed description are for the purpose of convenience only and are not intended to limit the present invention.

FIGS. 1–5 provide different views of an illuminated sparkling pumpkin 10 according to one embodiment of the present invention. As shown in these figures, the illuminated sparkling pumpkin 10 generally has two major parts—a main body shell 20 and a base member 40 (shown in FIG. 6).

The main body shell 20 may be made using the molding process described hereinafter in more detail. As shown in FIGS. 1–5, in one embodiment, the main body shell 20 generally has a lobed spheroidal shape that is similar to that of a real pumpkin and has an aperture at a bottom portion which is generally circular in shape. The aperture at the bottom portion of the main body shell 20 is dimensioned and shaped to receive the base member 40 (shown in FIG. 6).

The main body shell 20 may also include recessed depressions 24, 26, 28 in a front face thereof in which fabric or paint eyes, a nose and a mouth may be attached or painted. A stem 22 may also be provided at the top of the main body shell 20. In the embodiment shown in FIGS. 1–5, the main body shell 20 is shaped to include a plurality of grooves or ridges 32 that generally extend vertically from top to bottom of the main body shell 20 to form lobes.

In one embodiment, the main body shell 20 is made from pelletized ethylene vinyl acetate copolymers (EVAs), or other materials equivalent thereof, in a rotational molding process. While EVAs have been used in film production, hot melt adhesive formulation, and wire and cable insulation, their use in a novelty illuminating sparkling pumpkin to impart an enhanced sparkling/glowing effect has not been known or used prior to this invention. In one embodiment, as illustrated from the enlarged view in FIG. 7, the main body shell 20 that is constructed from. rotational molding EVAs comprises the pelletized EVA 34 that are bonded together during the molding process. Through the manufacturing process described hereinafter, layers of the pelletized EVA 34 are formed physically overlapping with each other and constituting the main body shell 20. The main body shell 20 made from the pelletized EVA 34 also provides a flexibly rigid and durable construction.

Figure 6:
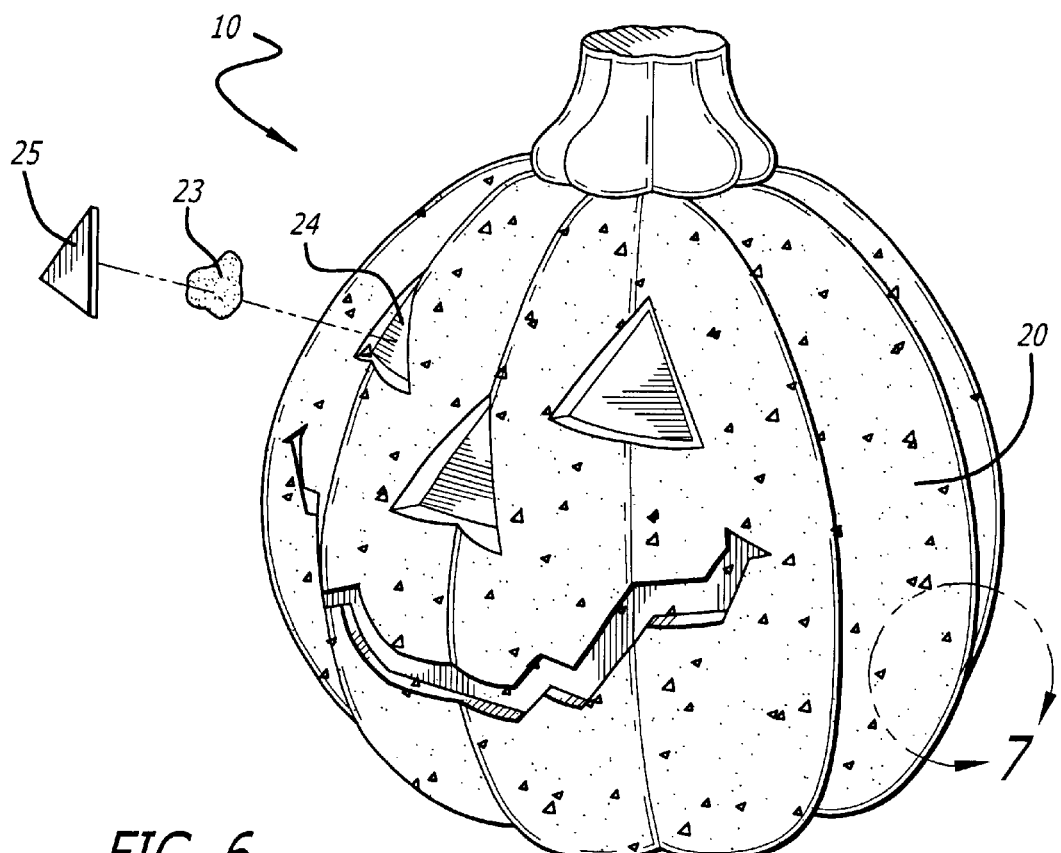
FIG. 6 is a perspective view illustrating different parts of the illuminated sparkling pumpkin according to one embodiment of the present invention.

In addition to the main body shell 20, as shown in FIG. 6, the illuminated sparkling pumpkin 10 includes a base member 40 having a battery receiving chamber interiorly thereof and an on-off switch (not shown). In one embodiment, the battery receiving chamber has a spring disposed therein and is dimensioned for receiving a battery therein. The battery receiving chamber is also preferably connected to a socket for receiving a threaded electrical connector of a light bulb. The battery receiving chamber may be adapted to open and close by loosening a screw for easy replacement of the battery when needed. As opposed to a battery operated light, it should be readily apparent that a cord could be provided to the device to power the light source.

In operation, the on-off switch is used to turn on the light bulb 42 positioned within the hollow interior section of the illuminated sparkling pumpkin 10. The light originating from the light bulb 42 then illuminates through the main body shell 20. Further, the overall structure or design of the main body shell 20, which is made of the pelletized EVA 34 as described above, has a characteristic of imparting an enhanced sparkling or glowing effect. Such an enhanced sparkling or glowing is achieved by a combination of the following structures.

Figure 7:
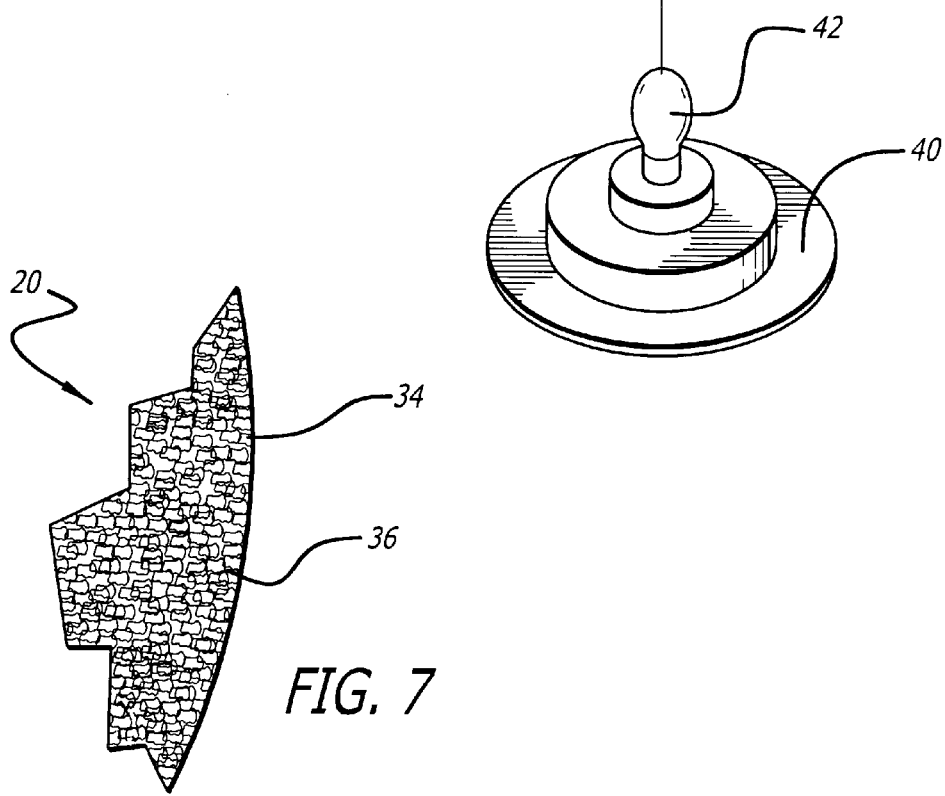
FIG. 7 is an enlarged view of a section of the shell of the illuminated sparkling pumpkin, which is indicated by a circular arrow 7 in FIG. 6, according to one embodiment of the present invention.

First, as shown in FIG. 7, there remains after molding openings or gaps 36 between the pelletized EVA 34 in the main body shell 20. The light originating from the light bulb 42 passes through these gaps without any obstruction, reflection, or dispersion. Second, some of the pelletized EVA 34 forming the exterior surface of the main body shell 20 have smooth glassy surfaces while others have rough or coarse surfaces. During the manufacture of the main body shell 20, some of the pelletized EVAs are forced against a wall in the mold and as a result have surfaces that are glassy. For other components, there is a smooth dispersion or wider spread of light passing through the pelletized EVA that have rough surfaces than those that have smooth surfaces. The pelletized EVA 34 forming the exterior surface of the main body 20 thus create a varying light dispersion effects. This varying light dispersion effects combined with the light that passes through the gaps 36 without any dispersion or reflection imparts an enhanced sparkling or glowing effect in the present invention. Further, the construction of the main body shell 20 made of the pelletized EVA 34 according to the present invention is durable and reliable. At the same time, the main body shell 20 has a malleable, rubber-like feel and characteristic that is not susceptible to easy breakage.

Figure 8:
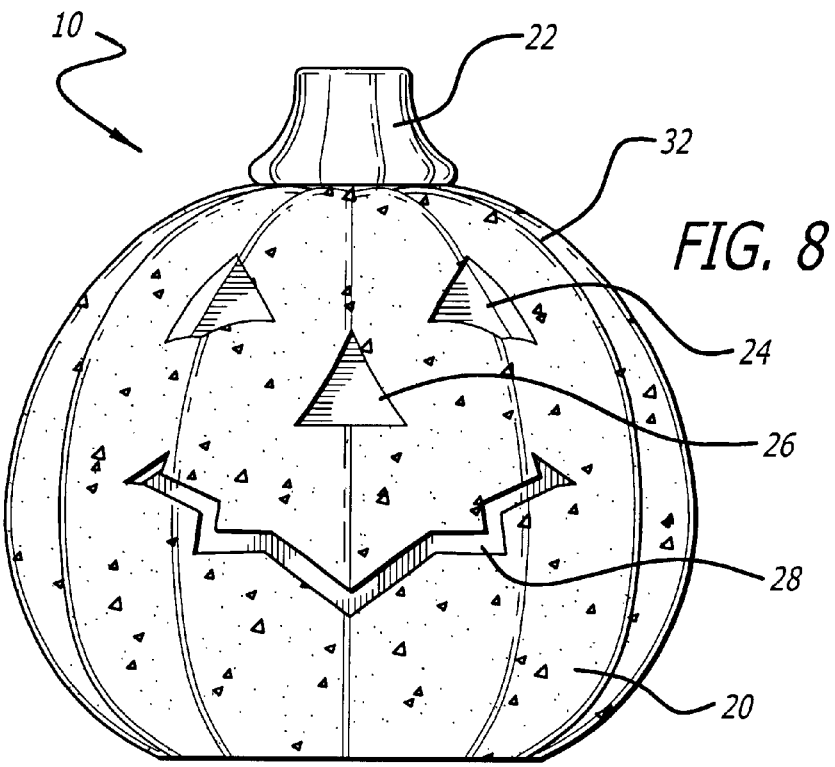
FIG. 8 is a perspective view of an illuminated sparkling pumpkin according to another embodiment of the present invention.
Figure 9:
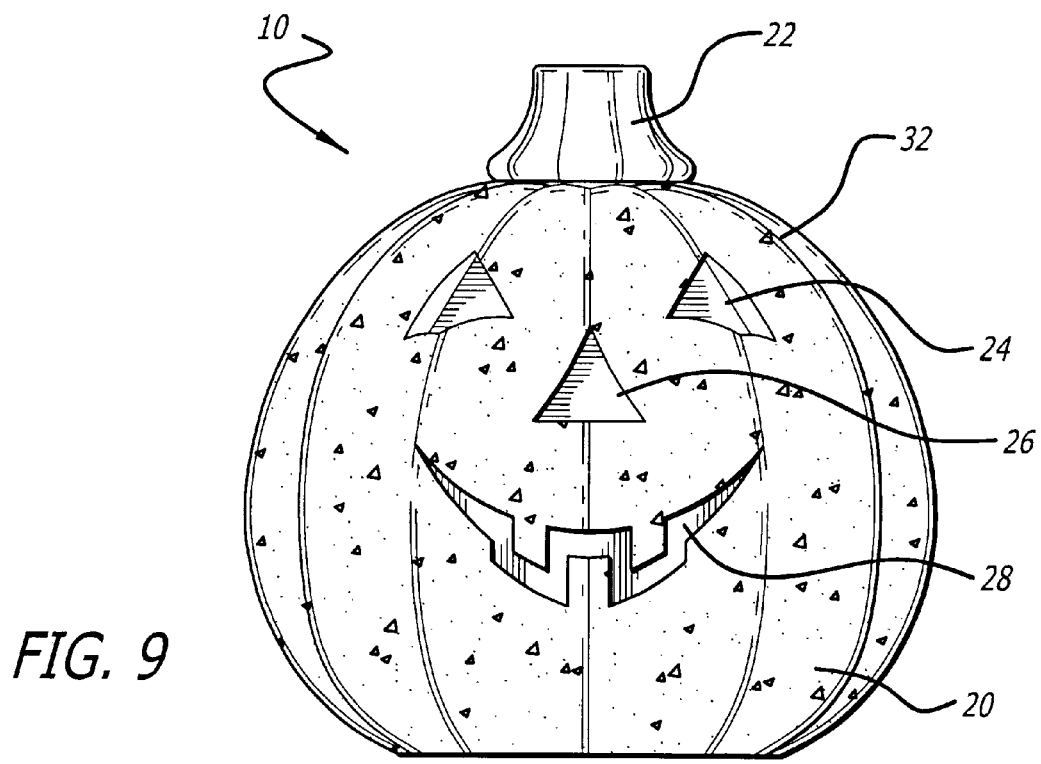
FIG. 9 is a perspective view of an illuminated sparkling pumpkin according to yet another embodiment of the present invention.

FIGS. 8 and 9 show alternative embodiments or configurations of the features of the illuminated sparkling pumpkin 10 according to the present invention. FIGS. 8 and 9 show illuminated sparkling pumpkins 10 having a different recessed depression shape for the mouth 28. These embodiments are provided as representative samples, however, it is to be understood that illuminated sparkling pumpkins having different size, shape, recessed depressions and color may be manufactured utilizing the process 50 described below.

The illuminated sparkling pumpkin 10 of the present invention is constructed generally utilizing the following process. The pelletized raw material such as ethylene vinyl acetate copolymers is placed into a mold. A coloring chemical or agent may be added to give a desirable color to the main body shell 20. Orange is usually the color of choice for the illuminated sparkling pumpkin 10, but other colors may be selected as desired. Further, molds having different size and shape may be used to make illuminated sparkling pumpkins of different size and shape.

The mold filled with the pelletized EVA raw material and coloring agents may be then placed into a processing machine. In one embodiment, a rotating processing machine is used, and when the door of the processing machine is closed, the mold is automatically rotated and the mold is heated to an operating temperature. The machine is heated, in an embodiment using pelletized EVA, up to about 250 degrees Celsius. Once the machine reaches the operating temperature, the mold should be kept inside the machine until the main body shell 20 is formed. It may take up to about 6 to 7 minutes before the main body shell 20 is properly formed. As a result of the molding and heating process described herein, pelletized EVAs, which have a discrete, particulate pelletized shape, are heated, cooled, and bonded together forming the main body shell 20 defined by the shape of the mold. The resulting product, the main body shell 20, is essentially a collection of the heated, cooled, and bonded pelletized EVAs which retain the discrete, pelletized shapes. Further, the main body shell 20 preferably includes a stem 22 and a generally circular aperture at a bottom portion as described above.

Once the product is formed and taken out of the mold, the stem 22 may be painted, and the eyes, the nose, and the mouth may be painted, glued or affixed into the respective depressions 24, 26, 28 provided on the front face of the main body shell 20. As illustrated in FIG. 6, fabric eyes 25, a nose, or a mouth may be attached to the depressions 24, 26, 28 using a glue material 23. In one embodiment, the eyes, nose, and mouth are made of felt materials. Appropriate materials include, without limitation, a cloth of wool, fur, or cotton, or a material resembling felt such as heavy paper, organic, natural, or artificial fibers. It is understood, however, that other materials perceived to be appropriate or suitable to one skilled in the art might be used. For example, materials having florescent properties may be used to provide additional sparking effect.

The base member 40 including a battery chamber and a light bulb are installed at step 66 onto the main body shell 20. The base member 40 may be attached to the main body shell 20 by using epoxy glue or other similar adhesive materials known in the art.

Having thus described different embodiments of the invention, other variations and embodiments that do not depart from the spirit of the invention will become readily apparent to those skilled in the art. The scope of the present invention is thus not limited to any one particular embodiment, but is instead set forth in the appended claims and the legal equivalents thereof.

What is claimed is:

1. An illuminated sparkling pumpkin, comprising:
   a main body shell made of pelletized materials having an exterior surface forming a pumpkin-like shape, said exterior surface defining a hollow interior space; and
   a light source for providing illumination within said hollow interior space, wherein said main body shell imparts an enhanced glowing effect upon illumination from said light source.

2. The illuminated sparkling pumpkin of claim 1, said main body shell further comprising:

a front face having characterizing depressions;

a pumpkin stem-shaped protrusion positioned at a top portion of said main body shell; and a plurality of generally vertically extending grooves segmenting said main body shell, said main body shell further defining an aperture at a bottom portion of said main body shell.

3. The illuminated sparkling pumpkin of claim 1, said main body shell further comprising pelletized ethylene vinyl acetate copolymers (EVAs) having soft and rough surfaces, wherein said pelletized EVAs define gaps therebetween.

4. The illuminated sparkling pumpkin of claim 3, wherein said pelletized EVAs having soft and rough surfaces create a varying degree of light dispersion effect when illuminated.

5. The illuminated sparkling pumpkin of claim 1, said light source comprising:

an on-off switch; and a base member having a battery receiving chamber connected to a socket for receiving a threaded electrical connector of a light bulb.

6. The illuminated sparkling pumpkin of claim 5, wherein eyes, a nose, and a mouth are attached to said depressions.

7. A decorative pumpkin, comprising:

a main body shell made of rotationally molded pelletized copolymers and a coloring agent, said main body shell having an exterior surface forming a pumpkin-like shape, said exterior surface defining a hollow interior space; and a light source for providing illumination within said hollow interior space, wherein said main body shell imparts an enhanced glowing effect upon illumination from said light source.

8. The decorative pumpkin of claim 7, said main body shell further comprising:

a face section having characterizing depressions;

a pumpkin stem-shaped protrusion positioned at a top portion of said main body shell; and a plurality of generally vertically extending grooves segmenting said main body shell.

9. The decorative pumpkin of claim 8, wherein fabric eyes, nose, and mouth are attached in said depressions.

10. The decorative pumpkin of claim 7, wherein said pelletized copolymers are formed from ethylene vinyl acetate.

11. The decorative pumpkin of claim 7, wherein said pelletized copolymers have soft and rough surfaces, and wherein said pelletized parts define gaps therebetween.

12. The decorative pumpkin of claim 11, wherein said pelletized parts having soft and rough surfaces create a varying degree of light dispersion effect when illuminated by a light source providing illumination within said hollow interior space.

13. A method of manufacturing a synthetic pumpkin, comprising the steps of:

providing a pelletized raw material in a mold;

placing said mold in a processing machine;

rotating said mold while heating said mold to a pre-selected operating temperature;

maintaining said mold at said pre-selected operating temperature to form a main body shell having an exterior surface forming a pumpkin shape, said exterior surface defining a hollow interior space; and removing said formed main body shell from said processing machine.

14. The method of manufacturing the pumpkin of claim 13, further comprising adding a coloring agent to said mold.

15. The method of manufacturing the pumpkin of claim 13, wherein said pelletized raw material is ethylene vinyl acetate copolymer (EVA).

16. The method of manufacturing the pumpkin of claim 13, wherein said main body shell further comprises:

a face section having depressions forming Jack-o-lantern eyes, nose and mouth;

a pumpkin stem-shaped protrusion positioned at a top portion of said main body shell; and a plurality of generally vertically extending grooves segmenting said main body shell, wherein said main body shell further defining an aperture at a bottom portion of said main body shell.

17. The method of manufacturing the pumpkin of claim 16, further comprising the step of affixing eyes, nose, and mouth shaped elements in said depressions.

18. The method of manufacturing the pumpkin of claim 13, further comprising: providing a light source within said hollow interior space, wherein said light source includes an on-off switch and a base member having a battery chamber and socket for receiving a light bulb.

\* \* \* \* \*